H. M. JACOBSON.
HORSE RELEASER.
APPLICATION FILED JAN. 9, 1917.
1,221,056.
Patented Apr. 3, 1917.
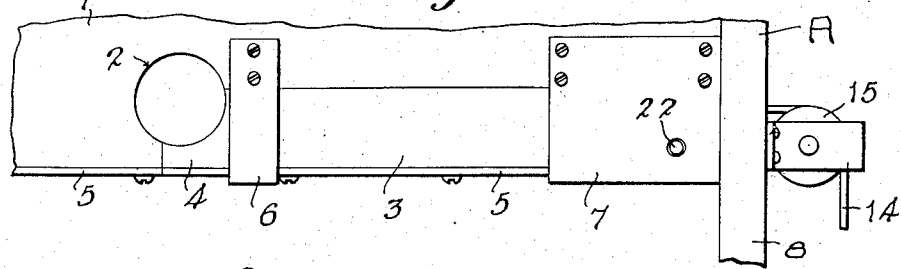
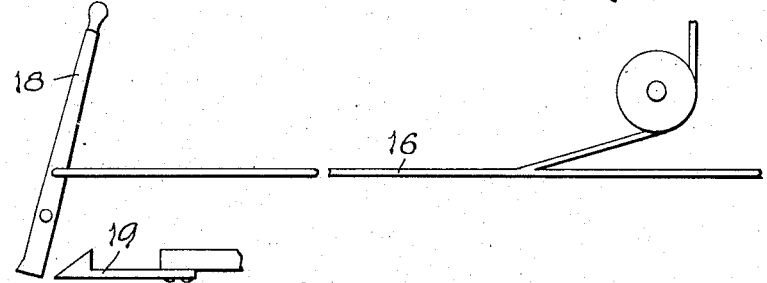
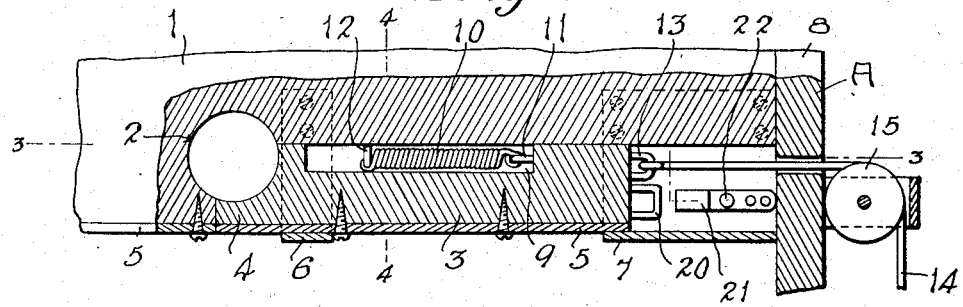
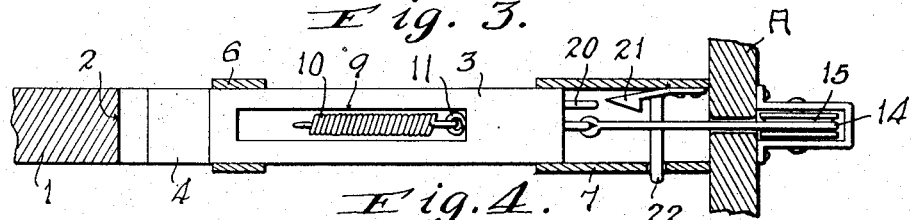
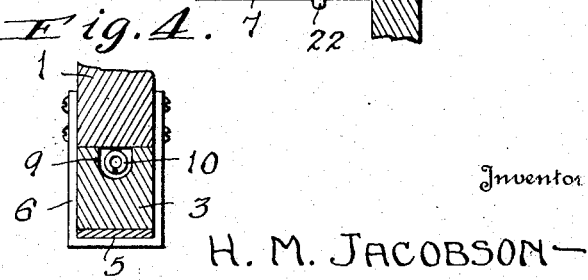
Inventor
H. M. JACOBSON
By
H. S. Hee
Attorney

UNITED STATES PATENT OFFICE.

HANS MAGNUS JACOBSON, OF WATERFORD, WISCONSIN.

HORSE-RELEASER.

1,221,056.  Specification of Letters Patent.  Patented Apr. 3, 1917.

Application filed January 9, 1917. Serial No. 141,453.

*To all whom it may concern:*

Be it known that I, HANS MAGNUS JACOBSON, a citizen of the United States, residing at Waterford, in the county of Racine, State of Wisconsin, have invented a new and useful Horse-Releaser; and I do hereby declare the following to be a full, clear, and exact description of the invention, such as will enable others skilled in the art to which it appertains to make and use the same.

The present invention relates to a horse releaser, and has for its object to provide a device of this character which embodies novel features of construction whereby in case of fire all of the horses or stock in a barn can be quickly released by opening the barn door and operating a master lever located adjacent thereto. This will not only save much valuable time which would otherwise be wasted in individually releasing each animal, but will enable horses to be released under conditions where it might be dangerous to reach them in any other manner.

Further objects of the invention are to provide a horse releaser which is comparatively inexpensive in its construction, which can be readily installed in any barn, which can be easily and quickly manipulated in case of fire, and which is thoroughly reliable and dependable in its operation.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a horse releaser constructed in accordance with the invention, the master lever and cables being shown in a diagrammatic manner.

Fig. 2 is a vertical longitudinal sectional view through the same.

Fig. 3 is a horizontal longitudinal sectional view on the line 3—3 of Fig. 2.

Fig. 4 is a transverse vertical sectional view on the line 4—4 of Fig. 2.

Corresponding and like parts are referred to in the following description and indicated in all the views of the drawings by the same reference characters.

Specifically describing the present embodiment of the invention, the numeral 1 designates a strip such as may extend across the end of each stall A, said strip being provided in the forward edge thereof with a notch 2 and having the edge portion on one side of the notch cut away to provide a clearance space for a slide 3. This slide is provided at one end thereof with a tongue 4 which is adapted to project across the mouth of the notch and close the same, thereby providing in effect an opening through which the halter rope can be tied in the usual manner. The forward edge of the slide 3 is flush with the forward edge of the strip 1, and the said forward edges are shown as having reinforcing plates 5 applied thereto. A U-shaped guide strip 6 extends around the slide 3 at a point adjacent the inner end thereof, while a guide casing 7 extends around the outer end of the slide and incloses the clearance space between the end of the slide and the side walls 8 of the stall.

The inner edge of the slide 3 is formed with a longitudinal groove or recess 9 for the reception of a tension spring 10, said spring having one end thereof connected to the slide, as indicated at 11, while the opposite end thereof is connected to a stop pin 12 projecting from the body of the strip 1. The spring 10 normally tends to move the slide 3 into operative position, and the pin 12 is arranged to engage one end of the groove 9 to limit the outward movement of the slide. An eye 13 projects from the rear end of the slide 3 and is engaged by a cable 14 which passes through an opening in the side wall 8 of the stall and is carried around a guide pulley 15. This cable 14 leads to a master cable 16, suitable guide members 17 being provided, said master cable being connected to a master lever 18 which is located at a point adjacent the barn door. A spring hook or detent 19 is provided for engagement with the master lever 18 to lock the same in operative position after it has been manipulated to pull upon the master cable 16 and cause all of the releasing slides 3 to be moved into inoperative position. This construction enables all of the horses and stock in a barn to be simultaneously and quickly released by merely opening the barn door and operating the master lever 18. By such an arrangement stock can often be saved which would otherwise perish owing to inability to reach it in time.

Means may also be provided for individually locking each of the slides 3 in an inoperative position. For this purpose a keeper 20 is shown as projecting from the rear end of each of the slides 3 for engagement with the nose of a spring detent 21 which is carried by the casing 7, said detent being provided with a lateral plunger 22 which extends through an opening in one side of the casing 7 so that the detent can be released by pushing inwardly upon the plunger. The detent 21 will automatically spring into engagement with the keeper 20 when the slide 3 is moved outwardly, and the slide will thus be locked and held in an open position until the detent is released by pressing inwardly upon the plunger.

Having thus described the invention, what I claim as new and desire to secure by Letters Patent, is:—

1. A horse releasing device including a notched strip having an edge thereof on one side of the notch cut-away, a slide mounted in said cut-away portion and terminating at its inner end in a tongue adapted to extend across the mouth of the notch, a spring engaging the slide to hold it in operative position, a guide casing engaging the outer end of the slide and providing a clearance space, an eye projecting from the rear end of the slide, a master lever located at a distance, a cable connection between the eye and the master lever, a keeper projecting from the rear end of the slide, a spring detent carried by the casing and mounted for engagement with the keeper to automatically lock the slide in an open position, and a plunger extending from the detent through one side of the casing for releasing the detent.

2. A horse releasing device including a notched strip having the edge thereof on one side of the notch cut-away, a slide mounted in said cut-away portion and terminating at its inner end in a tongue adapted to extend across the mouth of the notch, the inner edge of the slide being provided with a groove, a stop pin projecting from the strip into the groove for engagement with one end thereof to limit the outward movement of the slide, a spring housed within the groove and having opposite ends thereof connected to the pin and slide respectively, guide means for the slide, a master lever located at a distance, and a cable connection between the master lever and the slide.

In testimony whereof I have signed my name to this specification in the presence of two subscribing witnesses.

HANS MAGNUS JACOBSON.

Witnesses:
 WM. SANDERS,
 E. G. JACOBSON.

Copies of this patent may be obtained for five cents each, by addressing the "Commissioner of Patents, Washington, D. C."